United States Patent
Harada et al.

[11] Patent Number: 5,981,029
[45] Date of Patent: Nov. 9, 1999

[54] GAS BARRIER FILM CONTAINING INORGANIC STRATIFIED PARTICLES AND A PRODUCTION METHOD THEREOF

[75] Inventors: Yutaka Harada, Takatsuki; Masahiro Kimura, Otu; Koukichi Hashimoto, Otsu; Koichi Abe, Kyoto, all of Japan

[73] Assignee: Toray Industries, Inc., Tokyo, Japan

[21] Appl. No.: 08/825,338

[22] Filed: Mar. 28, 1997

[30] Foreign Application Priority Data

| Apr. 5, 1996 | [JP] | Japan | 8-083710 |
| Jun. 26, 1996 | [JP] | Japan | 8-165837 |
| Sep. 26, 1996 | [JP] | Japan | 8-254326 |
| Oct. 9, 1996 | [JP] | Japan | 8-268431 |

[51] Int. Cl.⁶ ............................................. B32B 5/16
[52] U.S. Cl. ...................... 428/143; 428/323; 428/327; 428/331; 428/339; 428/704
[58] Field of Search ................... 428/323, 331, 428/327, 143, 339, 104

[56] References Cited

U.S. PATENT DOCUMENTS

| 4,104,438 | 8/1978 | Angelo et al. | 428/332 |
| 4,180,614 | 12/1979 | Angelo et al. | 428/336 |
| 4,978,572 | 12/1990 | Akao | 428/323 |
| 5,667,886 | 9/1997 | Gough et al. | 428/331 |
| 5,700,560 | 12/1997 | Kotani et al. | 428/325 |
| 5,763,088 | 6/1998 | Nakano et al. | 428/424.8 |
| 5,766,751 | 6/1998 | Kotani et al. | 428/323 |

FOREIGN PATENT DOCUMENTS

| 0518647 | 12/1992 | European Pat. Off. |
| 0691376 | 1/1996 | European Pat. Off. |
| 0301878 | 2/1998 | European Pat. Off. |
| 3093542 | 4/1998 | Japan. |

*Primary Examiner*—Hoa T. Le
*Attorney, Agent, or Firm*—Birch, Stewart, Kolasch & Birch, LLP

[57] ABSTRACT

A gas barrier film comprises a thermoplastic resin substrate and on the substrate a gas barrier coating, which coating comprises a water soluble or water dispersible high polymer and inorganic stratified particles.

In one film, the surface of the gas barrier coating remote from the substrate has a roughness parameter Rt/Ra of 25 or less.

In an alternative film, the gas barrier coating contains an amine compound represented by the following general formula:

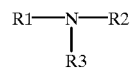

where R1 stands for a hydrogen atom, or a $C_{1-6}$ alkyl or allyl or phenyl group; R2 stands for a hydrogen atom, or an optionally substrated alkyl or allyl group; and R3 stands for an optionally substituted alkyl or allyl group.

20 Claims, No Drawings

GAS BARRIER FILM CONTAINING INORGANIC STRATIFIED PARTICLES AND A PRODUCTION METHOD THEREOF

BACKGROUND OF THE INVENTION

The present invention relates to a gas barrier film, in more detail, a gas barrier film having high impermeability to gas (hereinafter referred to as "gas barrierability") at high humidity and excellent in its adhesiveness to a thermoplastic resin substrate and post-lamination gas barrierability.

In the field of packaging for foods and chemicals, etc., ongoing developments have been made with a view to providing films with gas barrierability capable of preventing the ingress of open air, since any ingress of oxygen, etc. from open air does not allow long-term storage of contents due to deterioration.

According to Polymer Engineering and Science, (December 1986), vol. 20, No. 22, P. 1543~1546, conventionally developed films with gas barrierability include those of polyvinylidene chloride, polyacrylonitrile and polyvinyl alcohol. However, since polyvinylidene chloride contains chlorine atoms and polyacrylonitrile contains CN groups, then especially more recently, waste materials resulting from their preparation and use have caused serious environmental problems. Furthermore, in particular, since polyvinyl alcohol contains —OH groups, the gas barrierability of polyvinyl alcohol greatly depends on humidity and becomes remarkably low at high humidity. Similarly, the ethylene-vinyl alcohol copolymer, developed for reducing the humidity dependence of polyvinyl alcohol, still has insufficient gas barrierability at high humidity.

On the other hand, films having a vapor-deposited inorganic material such as silicon oxide (JP-B-53-012953, etc.) or aluminum oxide (JP-A-62-179935, etc.) on the surface of a substrate were developed. However, these films have disadvantages in that the vacuum evaporation necessary for film formation raises the cost significantly and the film is hard to handle because of the inflexible inorganic coating and its poor adhesiveness to the substrate.

As a means for solving these problems, a film having a coating consisting of a metal oxide and polyvinyl alcohol formed on a substrate (JP-A-56-004563, etc.) was developed, but its gas barrierability at high humidity is still not satisfactory. Furthermore, films having a gas barrier layer consisting of inorganic laminar compounds and a highly hydrogen bondable compound (JP-A-06-093133, JP-A-07-041685, etc.) have been proposed, but the films are very disadvantageous in their productivity because long time drying or heat treatment is necessary in the step of forming a gas barrier layer with high gas barrierability, elongation gas barrierability, durability of gas barrierability and moreover, the adhesiveness that can be achieved between the coating material and the substrate is low. The elongation gas barrierability is a gas barrierability under elongation. If the elongation gas barrierability is high, gas barrierability would not deteriorate even if the film is stretched at the steps such as printing, dry laminate or package formation. The durability of gas barrierability is a gas barrierability after the film is subjected to a repeated twist and if this durability of gas barrierability is high, gas barrierability would not deteriorate even if the film is subjected to a vending at package formation or even if wrinkles are formed after package formation. If a film could be produced which had a gas barrier layer which adhered strongly to a substrate then a package, such as a bag, produced from such a film would be highly reliable because breakage or deformation would not occur and because the gas barrierability after lamination would not significantly deteriorate.

The present invention addresses the above mentioned problems of conventional gas barrier film and seeks to provide a solution by providing a gas barrier film comprising a substrate having thereon a gas barrier coating, which film has gas barrierability even at high humidity and under elongation and also has durability of gas barrierability and with adhesiveness of the gas barrier coating to the substrate and post-lamination gas barrierability.

SUMMARY OF THE INVENTION

The present invention provides a gas barrier film comprising a thermoplastic resin substrate having thereon a gas barrier coating, which coating comprises a water soluble or water dispersible high polymer and inorganic stratified particles, and which coating has at least one of the following features, namely:

(a) the coating has a surface, remote from the substrate, having a surface roughness parameter Rt/Ra of 25 or less, preferably 20 or less; and (b) the coating contains an amine compound represented by the following general formula:

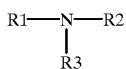

where R1 stands for a hydrogen atom, or a $C_{1-6}$ alkyl or allyl or phenyl group; R2 stands for a hydrogen atom, or an optionally substituted alkyl or allyl group; and R3 stands for an optionally substituted alkyl or allyl group.

The present invention provides a gas barrier film which has high gas barrierability even at high humidity and under elongation, and also has durability of gas barrierability, adhesiveness and printability, developed by providing a barrier layer having a specific surface roughness parameter and consisting of a water soluble or water dispersible high polymer and inorganic stratified particles. This film is expected to be useful commercially as a packaging material which is reliable for allowing its contents to retain their quality for a long period of time.

DESCRIPTION OF THE PREFERRED EMBODIMENTS

Preferred embodiments of the invention will now be described in more detail.

The present invention has resulted in the development of a gas barrier film with high gas barrierability at high humidity and under elongation, and also has durability of gas barrierability, and also with adhesiveness and post-lamination gas barrierability, and provides a promising packaging material highly reliable in preservability.

The inorganic stratified particles present in the gas barrier coating of a film embodying the present invention may be provided by an inorganic particles formed by overlapping one to several very thin unit crystal layers. Among them, especially a clay is preferably used. A particularly suitable clay of this type has a crystal structure capable of coordinating and absorbing water in the clearances between respective very thin unit crystal layers to allow swelling, and in general, has a stratified structure in which layers with $Si^{4+}$ coordinated to $O^{2-}$ to form a tetrahedron structure and layers with $Al^{3+}$, $Mg^{2+}$, $Fe^{2+}$, $Fe^{3+}$ or $Li^+$, etc. coordinated to $O^{2-}$ and $OH^-$ to form an octahedron structure are bonded in 1:1 or 2:1 and overlapped. The clay can be natural or synthetic. Typical clays include kaolinite, halloysite, montmorillonite, vermiculite, saponite, dickite, nacrite, antiogorite, pyrophyllite, hectorite, beidellite, margarite, talc, tetrasilylic mica, muscovite, phlogopite and chlorite. Among them, inorganic stratified particles called smectites such as montmorillonite, saponite, hectorite and beidellite are preferably used. The diameter of the inorganic stratified particles is not listed; however, when the diameter is 0.2 μm or less, especially 0.05 μm or less, adhesiveness is improved. On the other hand, when it is 1 μM or more, especially 5 μm or more, gas barrierability itself and of post-package-formation is improved. Furthermore, the coating preferably contains two kinds of particle which have respective different particle diameters, which different particle diameters are most preferably 0.2 μm or less and 1 μm or more, since then it is possible to achieve both of the improved properties referred to above.

The water soluble or water dispersible high polymer of the gas barrier coating of a film embodying the present invention is preferably a high polymer which can be easily dissolved or finely dispersed in water at room temperature, and can be selected, for example, from polyvinyl alcohol based polymers and their derivatives, cellulose derivatives such as carboxymethyl cellulose and hydroxyethyl cellulose, starches such as oxidized starch, etherified starch and dextrin, polyvinyl pyrrolidone, copolymerized polyesters containing polar groups such as sulfoisophthalic acid, vinyl based polymers such as polyhydroxyethyl methacrylate and its copolymers, acrylic high polymers, urethane based high polymers, ether based high polymers, and these various polymers modified by functional groups such as carboxyl groups, amino groups or methylol groups. Polyvinyl alcohol based polymers and their derivatives are preferable, and polyvinyl alcohol having a degree saponification of 80 mol % or more and copolymerized polyvinyl alcohols containing 60 mol % or more of vinyl alcohol as a component are especially preferable. The degree of polymerization of the polyvinyl alcohol based polymers and their derivatives is preferably 100 to 5000, more preferably 500 to 3000, still more preferably 1200 to 2500.

In accordance with one aspect of the present invention, improvement in gas barrierability is rendered possible by controlling the surface roughness parameters Rt/Ra. Rt refers to the maximum height which is the distance between the highest crest and the deepest trough, and Ra refers to the average roughness at the center line. The surface roughness parameter Rt/Ra is maintained at 25 or less, preferably 20 or less. If the surface roughness parameter Rt/Ra exceeds 25, gas . barrierability, especially gas barrierability under elongation and durability of gas barrierability may decline. It is understood that the reason for this is that during high speed coating formation, the coating layer is abraded by, contact with rollers or with another film, and the coating breaks down, with aggregated particles at the surface. A surface roughness parameter Rt/Ra value of 25 or less can preferably be achieved by preparing a smooth substrate from a resin containing inorganic or organic particles of uniform size, and preparing a coating material with the components very homogeneously dispersed, and applying the coating material onto the smooth substrate and drying at a temperature of 180° C. or lower within a short time of 30 sec or less. To disperse the coating components homogeneously, it is especially important that the coating liquid containing particles is preferably subjected to a strong dispersing treatment, such as with a homomixer, jet agitator, ball-mill, kneader, sand-mill, or triple roll kneader, to avoid aggregation of the inorganic stratified particles When a homomixer or jet agitator is used; it is preferably operated at 1000, rpm or more. The detail of parameters is described, for example, in Jiro Nara, "Methods for Measuring and Evaluating Surface Roughnesses" (Sogo Gijutsu Center, 1983).

In accordance with another aspect of the present invention, improvement in adhesiveness and post-lamination gas barrierability is rendered possible by providing in the coating an amine represented by the following general formula:

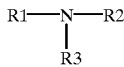

where R1 stands for a hydrogen atom, or a $C_{1-6}$ alkyl or allyl or phenyl group, preferably, hydrogen, methyl, ethyl, propyl, or phenol group; R2 stands for a hydrogen atom, or an optionally substituted alkyl or allyl group, preferably, hydrogen, $C_{1-4}$ alkyl chain or a substitution thereof; and R3 stands for an optionally substituted alkyl or allyl group, preferably, $C_{1-4}$ alkyl chain or a substitution thereof.

The substituents referred to above include amino, imino, alkoxy, carboxyl, sulfone, cyano, methylol, vinyl, hydroxyl groups and chlorine and metal alkoxide groups such as alkoxysilane, alkoxy titanium and alkoxy aluminum, their hydrolytic products, and preferred amines contain an alkyl chain or allyl chain substituted by one of more of these substituent groups. As substituent groups for R2 is, preferably, amino, vinyl and chlorine groups, and as substituent groups for R3, alkoxy, carboxyl, hydroxyl, sulfone, methylol, metal alkoxy and its hydrolytic products are preferable. The amine compounds which can be used include alkylamines such as propylamine, diethylamine, butylamine and hexylamine, amino alcohols such as aminoethyl alcohol, aminohexyl alcohol and aminoethylamino ethanol, diamines such as ethylenediamine, propylenediamine, amino acids such as aminoacetic acid, aminohexanoic acid and aminododecanoic acid, silane coupling agent having amino group such as γ-aminopropyltriethoxysilane, γ-(2-aminoethyl)-aminopropyltrimethoxysilane, γ-(2-aminoethyl)-aminopropyldimethoxysilane, γ-aniroinopropyl-trimethoxysilane, γ-ureidopropyltriethoxysilane. Among them, $C_{1-4}$ alkylamines such as propylamine, diethylamine or butylamine, amino acids with 1–4 carbon atoms such as aminoacetic acid, aminohexanoic acid and silane coupling agents having amino and alkoxysilane groups at both molecular ents such as γ-aminopropyl-triethoxysilane and γ-(2-aminoethyl)aminopropyl-trimethoxysilane can be preferably used it is preferable that the amine compound is present in an amount of 0.01 to 40 wt % based on the total weight of the components of the coating.

For the present invention, the number of undulations having a diameter in the range of 25 to 100 μm is preferably 1 to 150 per 1 mm² more preferably 5 to 100, still more preferably 10 to 80, for improved durability of gas barrierability. The number of undulations is measured and defined as follows. An image of the film surface at low magnification (approximately 5 times) measured with an optical microscope is processed by utilizing an image analyzer, etc. Here, the image processing is carried out so as to, record the crests and troughs existing on the film surface. Each of the crests/troughs observed in the image is replaced with an equivalent circle, and the number of the circles in the range of 25 to 100 μm in diameter is counted to determine their frequency per 1 mm², which is taken as the number of undulations. If the number of undulations is 1 or less, slipping characteristics of the film, as well as its durability of gas barrierability may become insufficient. If the number of undulations is 150 or more, the roughness of the surface becomes very large, worsening the take-up characteristics of the film. It is thought that such undulations are attributed mainly to aggregation of inorganic stratified particles in the dispersion liquid, which grow to the aggregation of the particles and polymer in the coating material as a result of their interaction, allowing the aggregate to form undulations on the coated surface. Since these undulations result from the aggregation of particles and polymer, the film surface is, highly resistant to chafing due to friction etc., which is favorable in improving the slipping characteristics of the surface. Such undulations can occur when there are aggregated particles, when interaction between particles and polymer is too strong, or when the concentration of the coating material is too high. Preferred methods to keep the number of undulations within the above-mentioned range include homogeneous dispersion of the components in the coating, and control of the interaction between particles and polymer in the coating material through surface treatment of the inorganic stratified particles. To disperse the components of the coating homogeneously, the mechanical dispersion may be applied to the particle-dispersed solution and coating material using equipment that can exert a shear force or a shear stress, such as a homomixer, jet agitator, ball mill, kneader, sand mill or triple roll kneader, or a mixed solution of water and lower alcohol may be used as solvent for the coating material. A lower alcohol is an alcoholic compound having a linear or branched aliphatic chain having 1 to 3 carbon atoms, and may be any of methanol, ethanol, and n- or iso-propanol. Furthermore, the ratio of water/alcohol is preferably 99/1 to 20/80 by weight. When using a homomixer or a jet agitator, it is preferable to use it at 1,000 rpm or mores. For the surface treatment of inorganic stratified particles, the above-mentioned amines and silane coupling agents are preferably used. Alkylamines with 1 to 4 carbon atoms, amino acids with 1 to 7 carbon atoms, and silane coupling agents having amino and alkoxysilane groups at both end of the molecule are especially preferable since the particles treated with those surface treating agents can be dispersed homogeneously in the solvent.

For the present invention, for improved, durability of gas barrierability and especially for improving printing characteristics, the number of any surface defects of 0.2 $\mu$m or larger existing on the coating surface is preferably 5 or less per 10 cm$^2$, more preferably 3 or less. The surface defects of this size can be identified visually and can be a cause for uneven, printing. Preferred methods of keeping the number of surface defects to 5 or less include mechanical dispersion carried out with equipment capable of applying a shear force or a shear stress to ensure absence of aggregate in the coating material, using a mixed solvent of water/lower alcohol as solvent for the coating material, and improving the dispersion characteristics through surface treatment of inorganic stratified particles. As a matter of course, since it is important to prevent air bubbles from being formed in the coating material, it is particularly preferable to use the method of using a mixed water/lower alcohol as solvent for the coating material as it is effective for decreasing the surface tension of the coating material.

Furthermore, for the present invention, for improved, durability of gas barrierability, it is preferable that the surface roughness parameter Rp is 1.4 $\mu$m or less, more preferably 1.2 $\mu$m or less. Rp refers to the distance between the center line of the surface roughness curve and its maximum height.

For the present invention, it is preferable that the water content in the coating is 3 mg/cm$^3$ or less, preferably, 2.5 mg/cm$^2$ or less, more preferably, 1.5 mg/cm$^2$ or less. When the water content is within this range, not only gas barrierability but also elongation gas barrierability and adhesiveness will improve. This is because the strength of the coating improves as the water content in the coating is lowered. Furthermore, the blocking resistance improves. To keep the water content to 3 mg/cm$^3$ or less, a solvent that has a low boiling point, high volatility, and affinity with water may be added to the solvent of the coating material. As such a solvent with a low boiling point, a lower alcohol is preferred. It is also preferable to dry at a temperature higher than 100° C.

Furthermore, in the infrared absorption spectrum from the coating surface, it is preferable that the relative intensity, P, represented by the following general formula, is 35 or less, preferably 30 or less, more preferably, 25 or less. Here, Pw stands for the relative intensity of the peak attributable to the polar groups in the water soluble or water dispersible polymer in a wet state., and Pd stands for the relative intensity of the peak attributable to the polar groups of polymers in a dry state.

$$P=10033\ (Pw-Pd)/Pd.$$

The relative intensity P relates mainly to the volume of water molecules connected through hydrogen bond with polar groups in the water soluble or water dispersed polymer in the coating. If P is within the above-mentioned range, not only gas barrierability but also elongation gas barrierability and adhesiveness improve. In order for the relative intensity P to become 35 or less, the above-mentioned method of adding a solvent with a low boiling point to the solvent for the coating material is preferably used in combination with a highly water resistant polymer. When using a polyvinyl alcohol based polymer, it is preferable that the degree of saponification of more than 60 wt % of the polyvinyl alcohol is 80 mol % or more.

In a gas barrier film embodying the present invention, the coating can contain a crosslinking agent. The amount present may be 0.01 to 10%, preferably 0.05 to 8% based on the weight of the components of the coating. The crosslinking agent used is not especially limited as long as it can react with the water soluble or water dispersible high polymer, and, for example, epoxy based crosslinking agents, isocyanate based crosslinking agents, melamine based crosslinking agents, oxazoline based crosslinking agents, and silane coupling agents, can be used.

The mixing ratio of the inorganic stratified particles/water soluble or water dispersible high polymer in the coating of a film embodying the present invention is preferably 1/99~60/40, more preferably 5/95~60/40. If the ratio is smaller than 5/95, gas barrierability may decline, and if larger than 60/40, adhesiveness may declines.

Furthermore, preferably the coating is oriented at least in one direction, because this improves the gas barrierability. In order to orient the coating at least in one direction, it is preferable to apply an in-line coating method. The orientation condition of the coating can be analyzed by any conventional technology such as refractive index measurement, total reflection infrared spectrum method and total reflection Raman spectrum method.

In a gas barrier film embodying the present invention, the thickness of the coating is not especially limited, but for improved gas barrierability, it is preferably 0.01 to 10 $\mu$m, especially, 0.01 to 0.5 $\mu$m for in-line coating and 0.3 to 6 $\mu$m for off-line coating.

A film embodying the present invention has a coating with inorganic stratified particles and a water soluble or water dispersible high polymer as main components. In other words, total weight of the inorganic stratified particles and the water soluble or water dispersible high polymer is at least 60%, preferably 70% based on the weight of all the components of the coating. As long as the gas barrierability and clarity are not impaired, various additives can be added, but these are preferably present in a total amount of 30% or less, preferably 20% or less. The various additives include, for example, an antioxidant, weather resisting agent, thermal stabilizer, lubricant, crystalline nucleating agent, ultrasonic absorbent, coloring agent, etc. As long as clarity and gas barrierability are not impaired, other inorganic or organic particles can also be present in an amount, preferably of 20 wt % or less. For example, calcium carbonate, titanium oxide, silicon oxide, calcium fluoride, lithium fluoride, alumina, barium sulfate, zirconia, potassium phosphate or crosslinked polystyrene can be used as the particles.

Moreover, to improve the inter-action between the inorganic stratified particles and the polymer, within the polymer or within the inorganic stratified particles when the coating is foamed, a divalent or higher valent metal salt or catalyst, for example, can also be added. If an acetate, sulfate or nitrate, for example, containing magnesium or aluminum element, for example, is used, humidity resistance can be further improved. It is preferably present in an amount of about 1 to 10000 ppm based on the weight of the coating.

The thermoplastic resin substrate of a gas barrier film embodying the present invention is necessary mainly for providing mechanical properties and film processability, and various generally marketed thermoplastic resin films can be used for this purpose. Typical materials for the substrate include, though not limited to, polyolefins such as polyethylene and polypropylene, polyesters such as polyethylene terephthalate, polybutylene terephthalate and polyethylene-2,6-naphthalate, polyamides such as nylon 6 and nylon 12, polyvinyl chloride, ethylene vinyl acetate copolymer and its saponified product, polystyrene, polycarbonate, polysulfone, polyphenylene oxide, polyphenylene sulfide, aromatic polyamide, polyimide, polyamideimide, cellulose, cellulose acetate, polyvinylidene chloride, polyacrylonitrile, polyvinyl alcohol and their copolymers. In view of cost performance, clarity, gas barrierability, etc., polyesters such as polyethylene terephthalate, and polyolefins such as polyethylene and polypropylene are preferable.

When a polyolefin resin is used as thermoplastic resin substrate, it is preferable that the ratio between the number of nitrogen atoms and carbon atoms, N/C, on the surface facing the coating is 0.001 to 0.1, more preferably 0.0015 to 0.08, particularly preferably 0.02 to 0.05, since the adhesiveness improves. The value of N/C can be determined by X-ray photoelectron spectroscopy (ESCA). The N/C value of the coating can be determined from the spectrum of the surface of the substrate after removing the coating by hot water treatment or sputtering. It may also be determined from the compositional distribution in the depth direction, measured with a secondary ion mass spectrometer (SIMS). In order for the N/C value to be within the above-mentioned range, corona discharge treatment may be performed on the surface of the substrate before coating layer formation, or plasma treatment may be carried out under reduced pressure in a lean gas. As the ambient atmosphere at the time of the corona discharge treatment, nitrogen gas (oxygen content 3 vol % or less), carbon dioxide gas or a mixed gas of nitrogen/carbon dioxide gas is preferable, with a mixed gas with a volume ratio of 95/5 to 50/50) being more preferable.

For plasma treatment, a glow is discharged from an electrode under high voltage toward the surface of the film while introducing a small amount of argon, helium and carbon dioxide gas, etc. into the container with approximately $10^{-2}$ Pa vacuum. At this time, from the viewpoint of processing effects and economical efficiency, carbon dioxide gas is preferable. The intensity of the treatment is calculated from the formula (voltage×current)/(width of electrode×film travel speed) ($w \cdot min/m^2$), which is preferably 5 to 400, more preferably 10 to 200, still more preferably 20 to 100.

It is also preferable that the degree of heat shrinkage of the coating at 120° C. is 1% or less for stabilizing the gas barrierability and elongation gas barrierability.

The thermoplastic resin substrate can be non-stretched, monoaxially stretched or biaxially stretched, but for improved dimensional stability and mechanical properties, a biaxially stretched substrate is especially preferable. Furthermore, the thermoplastic resin substrate can also contain various additives such as an antioxidant, weather resisting agent, thermal stabilizer, lubricant, crystalline nucleating agent, ultraviolet absorbent or coloring agent. Moreover, as long as clarity is not impaired, the substrate can also contain inorganic or organic particles of, for example, talc, kaolin, calcium carbonate, titanium oxide, silicon oxide, calcium fluoride, lithium fluoride, alumina, barium sulfate, zirconia, mica, calcium phosphate and crosslinked polystyrene.

The above particle size is preferably 0.001 to 10 $\mu$m, more preferably 0.003 to 5 $\mu$m. The average particle size is obtained by photographing at 10000 to 100000 times using a transmission microscope, etc. and calculating the number average.

Furthermore, it is preferable that the thermoplastic resin substrate is transparent. Its light transmittance is preferably 40% or more, more preferably 60% or more. Moreover, it is preferable that the thermoplastic resin substrate is smooth. The thickness of the thermoplastic resin substrate is not especially limited, but is preferably 2 to 1000 $\mu$m.

In a gas barrier film embodying-the present invention, it is preferable to form a layer of a metal and/or a metal oxide on the coating or between the coating and the thermoplastic resin substrate for improved gas barrierability, vapor barrierability and adhesiveness. It is more prefarable that the coatings are formed on both surfaces of the metal and/or metal oxide layer for improved elongation barrierability and adhesiveness. The metal and/or the metal oxide is not especially limited, but a metal and/or a metal oxide of aluminum, silicon, etc. is preferable.

A typical method for producing the gas barrier film of the present invention is described below.

The method for applying the coating onto the thermoplastic resin substrate is not especially limited, and can be extrusion lamination or melt coating. However, since a thin coating can be formed at a high speed, it is preferable to apply a dispersion with the components of the coating dispersed in any of various solvents, by gravure coating, reverse coating, spray coating, kiss coating, die coating, knife coating, air knife coating or metering bar coating. The thermoplastic resin substrate can also be treated to improve adhesiveness by any conventional method before being coated, for example, by corona discharge treatment in air, nitrogen/carbonic acid mixed gas or any other atmosphere, plasma treatment under reduced pressure, flame treatment or ultraviolet treatment. As a matter of course, anchoring treatment may be performed with any conventional anchoring agent such as a urethane resin, epoxy resin or polyethylene-imine.

If a biaxially stretched film of a polyester such as polyethylene terephthalate or polyolefin such as polypropylene is used as the thermoplastic resin substrate, the coating can be applied in or off the line.

When in-line coating is performed, it is desirable to carry out coating before the film is subjected to heat setting. Heat setting refers to a process where film stretched by conventional technology is heat-treated at a temperature higher than the stretching temperature and lower than the film's melting point. Coating on non-stretched film, on monoaxially or biaxially stretched film just after stretching in the longitudinal or transverse direction is desirable. Usually, coating is applied onto a film just after stretching in one direction and before stretching in another direction.

The method for drying the coating is not especially limited, and, for example, hot roll contact, hot medium (air, oil, etc.) contact, infrared heating or microwave heating, can be used. The drying of the coating is preferably effected in a temperature range from 60° C. to 180° C. for 1 to 60 seconds, more preferably 3 to 30 seconds for improved gas barrierability.

The coating material containing the components of the coating is preferably a solution with inorganic stratified particles homogeneously dispersed or swollen in a solvent and with a water soluble or water dispersible high polymer homogeneously dissolved or dispersed in the solvent The solvent can be water or a mixed solution of water and a lower alcohol. For improved gas barrierability at high humidity, adhesiveness and productivity, it is preferable to use a mixed solution of water and a lower alcohol. The lower alcohol is an alcoholic compound with a linear chain or branched chain aliphatic group with 1 to 3 carbon atoms, and can be methanol ethanol, n- or iso-propanol. The mixing ratio of water/alcohol is preferably 99/1~20/80 by weight. If the mixing ratio is larger than 99/1, such problems as low gas barrierability at high humidity, poor adhesiveness between the coating and the substrate and low productivity may occur, and if smaller than 20/80, the dispersibility of the components of the coating in the solvent may be lowered.

The concentration of the coating material is not especially limited. However, from the viewpoint of productivity factors such as viscosity of the coating material and drying efficiency, etc., it is desirable to adjust it to 2.5% or more. When using coating material with a low concentration of less than 2.5% a solvent that has a low boiling point, high volatility, and affinity with water may be added to the solvent of the coating material, or the drying may be carried out at a temperature higher than 100° C.

To enhance the coatability onto the substrate, the mixed solvent can also contain another water soluble or water dispersible organic compound ms a third component as long as the stability of the dispersed solution can be maintained. The water soluble or water dispersible organic compound can be selected, for example, from alcohols such as methanol, ethanol, n- or iso-propanol, glycols such as ethylene glycol and propylene glycol, glycol derivatives such as methyl cellosolve, ethyl cellosolve and n-butyl cellosolve, polyhydric alcohols such as glycerol and wax, ethers such as dioxane, esters such as ethyl acetate, and ketones such as methyl ethyl ketone. The pH of the dispersed solution is preferably 2 to 11 for improved stability of the solution.

The method for preparing the coating material is not especially limited, but an effective method is to homogeneously disperse the inorganic stratified particles into a solvent, and then to mix a water soluble or water dispersible high polymer with the homogeneous solution. It is preferable that the water soluble or water dispersible high polymer and the stratified particles are very homogeneously dispersed in the solvent.

In particular, there is a possibility that the inorganic stratified particles have undergone aggregation in the dispersed solution. It is desirable to perform mechanical dispersion using equipment that can exert a shear force or a shear Stress, such as a homomixer, let agitator, ball mill, kneader, sand mill or triple roll kneader, after the inorganic stratified particles have been dispersed in the solvent. For example, it is preferable to use a method where the dispersing treatment is carried out by utilizing, for example, a jet agitator filled with glass beads, after the inorganic stratified particles have been dispersed homogeneously in water up to a content of several percent, and then the dispersing treatment is carried out again after it has been mixed with a polymer solution in which homogeneous dispersion has been achieved at a content of several percent, followed by the addition of a lower alcohol and water to adjust the concentration.

The solution can also contain, for example, a crosslinking agent or other particles, etc.

The present invention can provide a gas barrier film excellent in gas barrierability, vapor barrierability and adhesiveness by forming a layer of a metal and/or a metal oxide by conventionally known vacuum evaporation.

A film embodying the present invention is capable of providing excellent gas barrierability, elongation gas barrierability, durability of barrierability, post-lamination gas barrierability, printability and adhesiveness of its coating. Thus, it can be used as a material for various packages.

Methods for Evaluating Properties

The methods for evaluating properties of a gas barrier film embodying the present invention are as described below.
(1) Gas Barrierability An oxygen permeability measuring instrument (OX-TRAN2/20 produced by Modern Control) was used to measure the oxygen permeability according to ASTM D 3985 at 23° C. and at 75% RH or 80% RH.
(2) Elongation Gas Barrierability Gas barrierability was measured by the above-mentioned method using 15 cm×20 cm film samples which had been stretched approximately 5% in the longitudinal direction.
(3) Durability of Gas Barrierability Gas barrierability was measured by the above-mentioned method after subjecting 280 mm×180 mm samples to 100 times repeated processes (frequency: 40 times/min) in a Gelbo Flex tester at 23° C.
(4) Adhesiveness Between Coating and Substrate (i) Adhesiveness A A coating was cross-cut, to make one hundred 1 mm² meshes, and cellophane adhesive tape, "Cellotape" produced by Nichiban was stuck onto it, pressed strongly by finger and suddenly peeled in 90° direction. The adhesiveness was evaluated in 4 steps, with reference to the remaining coating meshes (⊚ . . . 100 ○ . . . 80~99 Δ . . . 50~79 X . . . 0~49). ⊚ and ○ were evaluated as providing good adhesiveness.

(ii) Adhesiveness B

A non-stretched polypropylene film (CPP, T3501, 50 μm, produced by Toray Plastic Film K.K.) was laminated onto the coating surface of the film using a polyurethane based adhesive by means of a dry laminator, and the lainate was aged at 40° C. for 48 hours. The respective sides opposite to the sides in contact with the adhesive were reinforced by a cellophane adhesive tape, and the laminate was cut in 15 mm width, to effect 180° peeling between the CPP and the film, for obtaining the peel strength. The peeling was effected at a peeling speed of 10 cm/min at 23° C. and 65% RH.

(5) Post-lamination Gas Barrierability

The gas barrierability of the laminate aged as described above was measured as described above.

(6) Post-package-formation Gas Barrierability

The laminate aged as described above item (4) was cut into 20 cm×20 cm square sheets and two of them were overlapped with CPP surfaces inside. A package filled with air was formed by heat sealing the four sides with impulse sealer. The package was cut and the gas barrierability of the cut film was measured as described above.

(7) Printing Characteristics

After printing with a nitrocellulose ink CCST (manufactured by Toyo Ink) using a gravure printing roll, the finish was evaluated according to the following criteria.

: wrinkle and irregularity of print did not occur

: It occurred very rarely; however, there was no problem.

(8) Surface Roughness Parameter Rt/Ra, Rp

A high precision thin film level difference measuring instrument, ET-lO manufactured by Kosaka Kenkyujo, was used for measurement under the following conditions, and the average of 20 measurements was adopted.

Probe tip radius: 0.5 $\mu$m

Probe loads: 5 mg

Measured length: 1 mm

Cutoff: 0.08 mm (9) Number of Undulations

After Al had been vapor-deposited onto the surface of the film, the reflected optical age of the film's surface (multiplying factor: 5 magnifications) was measured by means of an optical microscope (Metaloplan manufactured by Leitz). This image was then placed in an image analyzer (high vision convertible image analyzer PIS IV) for automatic image processing to obtain 2-value data (P tile method, 10%). Each of the undulations observed in the image was replaced with an equivalent circle, and the number of the circles with diameters in the range of 30 to 100 nm was counted. Measurements were taken at 20 different spots, and their average was calculated. Their number per 0.1 mm$^2$ was defined as the number of undulations.

(10) Surface Defects

Transmitted light image of the film was observed with an optical microscope (multiplying factor: 10 magnifications), and the number per 10 cm$^2$ of defects of 0.2 $\mu$m or larger was determined. Measurements were taken at 20 different spots, and their average was calculated; this was defined as the number of surface defects. In the transmitted light image, dark areas and ring-like areas were regarded as defects if their equivalent circles have a diameter of 0.2 $\mu$m or larger.

(11) Water Content

After the sample had been left under 80% RH at 23° C. for 2 days, it was quickly set in the sample chamber of a simultaneous thermogravity/gravity measuring instrument (TG-41M, GCMS-QP100 manufactured by Shimadzu Corporation). The water volume produced when it had been left in dry helium gas at 23° C. for 20 minutes was measured, and the value per 1 cm$^3$ of the coating was taken. Elsewhere, water volume generated from the thermoplastic resin substrate was measured and used for correction. The measuring conditions were as follows.

Sample volume: 12 cm$^2$ area

MS photographic sensitivity: GAIN 2.1

Range of mass number: m/z=10 to 500

Sample container: quartz container

Atmosphere: helium flux (100 ml/min)

(12) Relative Intensity P

After the sample had been left under 80% RH at 23° C. for 2 days, it was quickly set in the sample chamber, immediately followed by the measurement of the relative intensity of the peak corresponding to the polar groups of the water soluble or water dispersed polymer using FT-1R (IFS-120HR, manufactured by Bruker). The value was used as Pw. Then, after a nitrogen gas purge had been carried out, the relative intensity of the peak was measured after leaving it for 1 hour in a vacuum to obtain the Pd value. In the case where the polymer was PVOH, the intensity of the peak attributable to the stretching vibration of —COH (approximately 3350 cm$^{-1}$) was used. The measuring conditions were as follows.

Light source: SiC

Detector: MCT (HgCdTe)

Beam splitter: Ge/KBr

Resolution: 4 cm$^1$

Addition: 16 times

Abotization: triangle

Zero-filling: 2 magnifications

Phase correction: Merts method

Reference sample: Si

(13) Particle Size

By utilizing a centrifugal sedimentation type particle size distribution measuring instrument CAPA-700 (manufactured by Horiba Seishakujo), measurements were made at 23° C. for a solution that contained dispersed inorganic stratified particles and had the same solvent composition as the coating material used for the coating operation.

(14) Ratio of Nitrogen and Carbon Atoms (N/C) in the Surface of the Substrate

Using an ESCA spectrometer (ESCA 750 manufactured by Shimadzu Corporation), nitrogen's 1s orbit (N1s) spectrum and carbon's 1s orbit (C1s) spectrum were observed with is excited X-ray MgKα 1.2 (284.6 eV) at a photoelectric emission angle of 90°, and the ratio of the number of nitrogen atoms and carbon atoms on the surface of the substrate was determined from the relative integrated intensity of each peak.

(15) Thermal Shrinkage of the Film

After measuring the thermal shrinkage of the film in the longitudinal and transverse directions at 120° C. according to JIS-K-6782 for 15 minutes, the average values were calculated for the longitudinal and transverse directions.

(16) Vapor Barrierability

According to ASTM F-1249, a water vapor permeation measuring instrument (PERMATRAN-W1A manufactured by Mocon) was used to make measurements at 40° C. and 90% RH.

EXAMPLE 1

Synthetic hectorite of 2.0 $\mu$m in particle size (supplied by Topy Kogyo, Na-HT) as inorganic stratified particles was dispersed in water to provide solution Al with a solid content of 5 wt %. The solution Al was subjected to a mechanical dispersing operation using a jet agitator (3500 rpm) filled with glass beads (50 $\mu$mΦ) to ensure dissolution of aggregated particles to provide solution A2. Polyvinyl alcohol (hereinafter abbreviated as PVOH) with a saponification degree of 98.5 mol % and polymerization degree of 1700 was used as water soluble or water dispersed polymer, and water was used as solvent to provide solution B in which solid material was dispersed at a content of 5 wt %.

Solutions A2 and B were mixed so that the particles/PVOH ratio would be 40/60 by weight, followed by a dispersing operation (3500 rpm) in the homomixer, to prepare a coating material that contained isopropyl alcohol (hereinafter abbreviated as IPA) up to 10 wt % relative to the total solvent and had a solid content of 3 wt %.

Polyethylene terephthalate pellets (0.62 dl/g intrinsic viscosity) containing 0.015 wt % colloidal silica of 0.4 $\mu$m in average particle size and 0.005 wt % colloidal silica of 1.5 $\mu$m in average particle size was dried sufficiently and then melted at 285° C. in an extruder. It was then extruded through a T-shaped opening to form a sheet. The electrostatic casting method was used to wind the sheet around mirror finished casting drum with a surface temperature of 25° C. to cool the sheet for solidification. This non-stretched film was heated to 95° C., stretched to 3.2 times in the longitudinal direction, and, while being held with clips, stretched to 3.2 times in the width direction at 125° C., followed by heat treatment at 230° C. and corona discharge treatment in air at an intensity of 60 w·min/m$^2$ to provide a thermoplastic resin substrate (biaxially drawn polyester film). Then the above-mentioned coating material was applied on the treated side of the substrate using a reverse coater (coating speed 12 m/min), which was dried in a hot air dryer at 120° C. for 20 seconds under low tension to provide a film. The coating thickness of the film obtained was 0.8 $\mu$m and other characteristics are shown in Table 1, indicating that a film having excellent characteristics and suffering little scraping was obtained.

EXAMPLE 2

A film was obtained by the same process as described in Example 1, except that a water/IPA solution (90/10 by weight) was used as solvent to provide solution Al and that PVOH with a saponification degree of 99.96 mol % and a polymerization degree of 1700 was used as water soluble or water dispersed polymer to provide a coating material with a solid content of 5 wt %, followed by drying at 150° C. The film obtained was high in gas barrierability, elongation gas barrierability, and adhesiveness.

EXAMPLE 3

A film was obtained and wound by the same process as described in Example 1, except that only water was used as solvent to provide a coating material with a solid content of 1.5 wt % and that the coating material was applied on the surface (N/C value: 0.004) of a thermoplastic resin substrate prepared from biaxially drawn polypropylene film (Torayfan, manufactured by Toray Industries, Inc, 20 $\mu$m in thickness) that had been subjected to corona discharge treatment (in a carbon dioxide gas/nitrogen mixed gas of 83/17 by volume, processing intensity of 60 (w·min/m$^2$), followed by drying at 90° C. The heat shrinkage of the film obtained was 1.8%. Thus, a film with excellent gas barrierability, elongation gas barrierability and adhesiveness was obtained.

EXAMPLE 4

A film was obtained by the same process as described In Example 1, except that the concentration of the coating solution was 1% and the drying temperature for the coating was 60° C. A film with excellent durability of gas barrierability and printing characteristics was obtained.

EXAMPLE 5

A film was obtained by the same process as described in Example 1, except that PVOH with a saponification degree of 78 mol % and a polymerization degree of 500 was used as water soluble or water dispersed polymer and that the solid content in the coating material was 30/70 (particles/polymers), followed by drying at 95° C. A film with excellent durability of gas barrierability, adhesiveness, and printing characteristics was obtained

EXAMPLE 6

A film was obtained by the same process as described in Example 1, except that a mixture of synthetic hectorite of 7 $\mu$m in particle size (manufactured by Topy Industries, Na-HT classified by a centrifugal separator) and synthetic hectorite of 0.035 $\mu$m in particle size (RDS, manufactured by Nippon Silica Industries) in the ratio of 30/70 by weight was used as inorganic stratified particles and that the same polypropylene film as described in Example 3 was used as a thermoplastic resin substrate. A film high in durability of gas barrierability and printing characteristics, and particularly high in gas barrierability, elongation gas barrierability, and adhesiveness was obtained.

EXAMPLE 7

A coating material was prepared by the same process as described in Example 1, except that synthetic hectorite of 0.035 $\mu$m in particle size (RDS, manufactured by Nippon Silica Industries) was used and that the solid content was 10/90 by weight (inorganic stratified particles/water soluble high polymer).

Polyethylene terephthalate pellets (0.62 dl/g intrinsic viscosity) containing 0.015 wt % colloidal silica of 0.4 $\mu$m in average particle size and 0.005 wt % colloidal silica of 1.5 $\mu$m in average particle size was dried sufficiently in a vacuum and then melted at 285° C. in an extruder. It was then extruded through a T-shaped opening to form a sheet. The electrostatic casting method was used to wind the sheet around a mirror finished casting drum with a surface temperature of 25° C. to cool the sheet for solidification. This non-stretched film was heated to 95° C., stretched to 3.2 times in the longitudinal direction to provide a monoaxially drawn film. The film was subjected to corona discharge treatment in air and the above-mentioned coating material was applied on the treated surface using a bar coater. While being held with clips, the coated monoaxially drawn film was fed to the pre-heating zone, where it was dried at 110° C. for 15 seconds, followed by continuous stretching to 3.2 times in the heating zone at 125° C. Furthermore, it was heated in the heating zone at 230° C. to provide a desired film. The coating thickness of the film obtained was 0.2 $\mu$m. A film high in gas barrierability, elongation gas barrierability, durability of gas barrierability, and printing characteristics, and particularly high in adhesiveness was obtained.

Comparative Example 1

A film was obtained by the same process as described in Example 1, except that coating was not performed. A film with poor gas barrierability, elongation gas barrierability and durability of gas barrierability was obtained.

Comparative Example 2

A film was obtained by the same process as described in Example 1, except that coating was performed using a water soluble or water dispersed polymer alone. A film with poor gas barrierability, elongation gas barrierability, durability of gas barrierability and adhesiveness was obtained.

Comparative Example 3

A film was obtained by the same process as described in Example 1, except that globular silica particles (ST-O, manufactured by Nissan Chemical Industries, Ltd.) with 0.03 μm particle size was used instead of inorganic stratified particles A film poor in gas barrierability, elongation gas barrierability and durability of gas barrierability was obtained.

Comparative Example 4

Synthetic sodium tetrasilylic mica (Na-TS, manufactured by Topy Industries, Ltd.) with 2 μm particle size was used as inorganic stratified particles and only water was used as solvent. Dispersion was performed to achieve a solid content of 2 wt % (solution a1). Then, PVOH with a saponification degree of 99.85 mol % and a polymerization degree of 1700 was used as water soluble or water dispersed polymer, and only water was used as solvent to provide solution b with a solid content of 2 wt %. Solution a1, which had not been subjected to a dispersing operation in a jet agtator filled with glass beads, and solution b were used to provide a mixture with a PVOH/particle mixing ratio of 55/45 by weight without performing dispersing operation with the homomixer. The coating material was adjusted to achieve a solid content of 2 wt %. The coating material was applied to a polyester film as used in Example 1. followed by drying at 80° C. and subsequent heat treatment at 180° C. for 60 seconds to provide a film. The surface roughness parameter Rt/Ra of the film obtained was 25.5. The film obtained was poor in elongation gas barrierability and durable gas barrierability, and the coat was found to suffer from severe scraping.

EXAMPLE 8

Montmorillonite of 0.8 μm in particle size (supplied by Kunimine Industries, Kunipia-G) was used as inorganic stratified particles, and water was used as solvent to provide solution Al with a solid content of 3.5 wt %. The solution Al was subjected to a mechanical dispersing operation using a jet agitator filled with glass beads (3500 rpm) to ensure dissolution of aggregated particles to provide solution A2. γ-(2-aminoethyl) aminopropyl-trimethoxysilane, an amine compound, was dispersed in water up to 3.5 wt %. The particle-dispersed solution and the amine-dispersed solution were mixed in the ratio of 96/4 by weight of solid contents, followed by a dispersing operation with a homomixer. Then it was mixed with solution B prepared in Example 1 so that the ratio of inorganic stratified particles/amine compound/water soluble or water dispersed polymers would be 48/2/50 by weight, followed by a dispersing operation with a homomixer. The coating material was adjusted so that the IPA content would be 10% based on the weight of the total solvent and the solid content would be 3% based on the weight of the total solution. The coating material was applied over a polyester film by the same method as described in Example 1, followed by drying to provide a film. The coating thickness of the film obtained was 0.9 μm, and other characteristics are shown in Table 2, indicating that the film was high in gas barrierability, elongation gas barrierability, durability of gas barrierability and printing characteristics, and particularly high in adhesiveness.

EXAMPLE 9

A film was obtained by the same process as described in Example 8, except that hexylamine was used as amine compound and that a polypropylene film as described in Example 3 was-used as thermoplastic resin substrate. The heat shrinkage of the film obtained was 0.7%. As shown in Table 2, a film with excellent gas barrierability, elongation gas barrierability, adhesiveness, and printing characteristics was obtained.

EXAMPLE 10

A film was obtained by the same process as described in Example 1, except that an oxazoline base crosslinking agent (K-1010E, manufactured by Nippon Shokubai Kagaku Kogyo Co., Ltd.) was added up to 5% relative to the solid content of the coating material and that polypropylene as described in Example 3 was used as thermoplastic resin substrate. The heat shrinkage of the film obtained was 0.7%. As shown in Table 2, a film high in gas barrierability, elongation gas barrierability, durability of gas barrierability, and printing characteristics, and particularly high in adhesiveness was obtained.

EXAMPLE 11

A film was obtained by the same process as described in Example 8, except that a mixture of PVOH with a saponification degree of 88 mol % and a polymerization degree of 1000 and PVOH with a saponification degree of 98.5 mol % and a polymerization degree of 2400 in the ratio of 20/80 by weight was used as water soluble or water dispersed polymer. The heat shrinkage of the film obtained was 0.8%. As, shown in Table 2, a film high in gas barrierability, elongation gas barrierability, durable gas barrierability, and printing characteristics, and particularly high in adhesiveness was obtained.

EXAMPLE 12

A film was obtained by the same process as described In Example 1, except that synthetic hectorite of 0.035 μm In particle size (RDS, manufactured by Nippon Silica Industries) was used to provide a coating material with an inorganic stratified particle/polymer ratio of 45/55 by weight and a solid content of 2.5%, and that the coating was dried at 110° C. for 10 seconds to achieve a coating thickness of 0.8 μm. The adhesiveness of the film obtained was 1.31 N/cm, indicating that a film with particularly high adhesiveness was obtained.

EXAMPLE 13

A film was obtained by the same process as described in Example 1, except that sodium tetrasilylic mica (Na-TS, manufactured by Topy Industries, classified in a centrifugal separator) with a particle size of 24.2 μm was used to provide a coating material with an inorganic stratified particle/polymer ratio of 30/70 by weight and a solid content of 2.5%, and that polypropylene film as used in Example 3 was used to achieve a coating thickness of 1 μm. The gas barrierability of the film (at 80%RH) obtained was 78.4 ml/m$^3$.d.Mpa, and that (at 80%RH) of a bag produced from the film was 135 ml/m$^3$.d.Mpa, indicating that the film was high in gas barrierability and particularly useful to produce bags with a high gas barrierability.

EXAMPLE 14

Montmorillonite (Kunipia G produced by Kunimine Kogyo) as inorganic stratified particles was dispersed into a mixed solvent of water/IPA (90/10 by weight), to achieve a montmorillonite content of 2 wt % (solution A). PVOH having a degree of saponification of 88.0 mol % and a degree of polymerization of 1700 as a water soluble or water dispersible high polymer was dispersed into a mixed solvent of water/IPA (90/10 by weight), to achieve a PVOH content of 2 wt % (solution B). Aminohexanoic acid as an amine compound was dispersed into water, to achieve an aminohexanoic acid content of 2 wt % (solution C). The solutions A and C were mixed at a ratio by weight of 90/10, and a coating material was prepared to be 45/5/50 as a ratio by weight of inorganic stratified particles/amine compound/water soluble high polymer, 10% as the amount of IPA based on the total weight of the solvent, and 1% in solid content. The coating material was applied to the same polypropylene film as used in Example 3, by a reverse coater (coating speed 12 m/min), and the coated film was introduced into a hot air dryer and dried at 120° C. at a low tension for 20 seconds, then being taken up. The properties of the obtained film are shown in Table 3. The obtained film was excellent in gas barrierability, adhesiveness and post-lamination gas barrierability.

EXAMPLE 15

γ-(2-aminoethyl)aminopropyltrimethoxysilane was used as the amine compound and PVOH having a degree of saponification of 98.5 mol % and a degree of polymerization of 2400 was used as the water soluble or water dispersible high polymer, to obtain the coating shown in Table 3 as described in Example 14. The obtained film was excellent in gas barrierability, adhesiveness and post-lamination gas barrierability.

EXAMPLE 16

Sodium tetrasilylic mica (produced by Topy Industries, Na-TS-S) was used as the inorganic stratified particles and the same polyester film as used in Example 1 was used as the substrate, to obtain a coating with the composition shown in Table 3, as described in Example 14. The obtained film was excellent in gas barrierability, adhesiveness and post-lamination gas barrierability

EXAMPLE 17

A film was produced using an electron beam heating type vapor deposition apparatus to deposit Al metal onto the film coating prepared in Example 1 which was carried out in a high vacuum to achieve at deposition thickness of 40–50 am. As shown in Table 4, a film with particularly high gas barrierability and vapor barrierability was obtained.

EXAMPLE 18

The same polyester film as used in Example 1 was vapor deposited with Al metal in the same way as Example 17, and the vapor deposited surface was coated in the same way as Example 1. As shown in Table 4, a film with particularly high gas barrierability, elongation gas barrierability, durability of gas barrierability, and vapor barrierability was obtained.

EXAMPLE 19

Coating was performed as in Example 1 onto the film obtained in Example 18 to provide a film. As shown in Table 4, a film high in gas barrierability and vapor barrierability, and particularly high in elongation gas barrierability and durability of gas barrierability was obtained.

Comparative Example 5

A film was obtained as described in Example 18, except that coating was not performed. In comparison with Experimental Examples 17, 18 and 19, the film obtained was very poor in elongation gas barrierability and durability of gas barrierability.

TABLE 1

|  | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|
| Rt/Ra | 16.8 | 14.6 | 16.4 | 13.4 | 17.5 | 15.3 | 10.9 | 14 | 12 | 17 | 28 |
| Number of undulations | 43 | 152 | 38 | 31 | 40 | 76 | 23 | 0 | 0 | 13 | 82 |
| Surface defects | 0 | 2 | 7 | 0 | 6 | 0 | 0 | 0 | 0 | 1 | 6 |
| Rp ($\mu$m) | 0.85 | 0.95 | 1.02 | 0.86 | 1.21 | 1.02 | 0.65 | 0.5 | 0.45 | 0.91 | 1.59 |
| Water content (mg/cm$^3$) | 1.25 | 0.98 | 2.4 | 3.2 | 2.1 | 1.35 | 0.85 | — | 3.5 | 3.3 | 1.1 |
| Relative Intensity P (%) | 25 | 22 | 31 | 38 | 36 | 26 | 21 | — | 39 | 37 | 24 |
| Gas barrierability (75% RH) (ml/m$^2$.d.MPa) | 9.8 | 9.6 | 11.6 | 18 | 17.6 | 8.5 | 10.6 | 1.176 | 491 | 294 | 9.6 |
| Elongation gas barrierability (75% RH) (ml/m$^2$).d.MPa) | 11.6 | 23.8 | 25.3 | 33.1 | 36.2 | 10.5 | 12.7 | 1.470 | 637 | 392 | 45.6 |
| Durability of gas barrierability (75% RH) (ml/m$^2$).d.MPa) | 25.3 | 54 | 44.5 | 34.1 | 31.9 | 26 | 28.3 | 2.450 | 833 | 882 | 73.5 |
| Adhesiveness A (N/cm) | ⊚ | ⊚ | ⊚ | ○ | ⊚ | ⊚ | ⊚ | ⊚ | X | ○ | Δ |
| Printing characteristics | ○ | ○ | Δ | ○ | ○ | ○ | ○ | ○ | ○ | ○ | Δ |

TABLE 2

|  | Example 8 | Example 9 | Example 10 | Example 11 |
|---|---|---|---|---|
| Rt/Ra | 15.6 | 13.8 | 14.8 | 12.3 |
| Number of undulations | 70 | 163 | 52 | 68 |
| Surface defects | 0 | 3 | 0 | 1 |
| Rp ($\mu$m) | 0.98 | 1.48 | 0.93 | 0.98 |
| Water content (mg/cm$^3$) | 1.09 | 1.51 | 1.15 | 1.57 |
| Relative intensity P (%) | 23 | 26 | 24 | 27 |
| Gas barrierability (75%RH) (ml/m$^2$ · d · MPa) | 11.6 | 13.3 | 10.5 | 9.4 |
| Elongaton gas barrierability (75%RH) (ml/m$^2$ · d · MPa) | 13.6 | 29.6 | 14.5 | 15.8 |
| Durability of gas barrierability (75%RH) (ml/m$^2$ · d · MPa) | 22.8 | 55.5 | 23.3 | 25.5 |
| Adhesiveness A (N/cm) | ◎ | ◎ | ◎ | ◎ |
| Adhesiveness B (N/cm) | 1.29 | 1.18 | 1.35 | 1.43 |
| Printing characteristics | ○ | ○ | ○ | ○ |

TABLE 3

|  | Example 14 | Example 15 | Example 16 |
|---|---|---|---|
| Weight ratio of coating composition Particle/amine/PVOH | 45/5/50 | 40/5/55 | 30/10/60 |
| Coating thickness ($\mu$m) | 1.0 | 1.1 | 0.9 |
| Gas Barrierability (75%RH) (ml/m$^2$ · d · Mpa) | 17.6 | 12.2 | 18.4 |
| Gas barrierability (80%RH) (ml/m$^2$ · d · Mpa) | 49 | 45 | 56 |
| Adhesiveness (N/cm) | 1.2 | 1.3 | 1.1 |
| Durability of gas barrierability (80%RH) (N/cm) | 105 | 98 | 118 |

TABLE 4

|  | Example 17 | Example 18 | Example 19 | Comparative Example 5 |
|---|---|---|---|---|
| Gas barrierability (75%RH) (ml/m$^2$ · d · MPa) | 4.6 | 3.9 | 3.5 | 4.9 |
| Elongation gas Barrierability (75%RH) (ml/m$^2$ · d · MPa) | 6.9 | 5.7 | 4.5 | 12.2 |
| Durability of gas barrierability (75%RH) (ml/m$^2$ · d · MPa) | 22.8 | 17.5 | 14.3 | 43 |
| Vapor Barrierability (g/m$^2$ · d) | 1.1 | 0.8 | 0.9 | 1.2 |

We claim:

1. A gas barrier film which comprises a polyolefin based resin substrate having thereon a gas barrier coating, which coating comprises a water soluble or water dispersible high polymer and inorganic stratified particles and which coating has a surface remote from the substrate, wherein said surface has a surface roughness parameter Rt/Ra of 25 or less, a number of undulations having a diameter of 25 to 100 $\mu$m of 1 to 150 undulations/mm$^2$ and said coating has a water content of 2.5 mg/cm$^3$ or less.

2. A gas barrier film according to claim 1, having a heat shrinkage at 120° C. of 1% or less.

3. A gas barrier film which comprises a thermoplastic resin substrate and a coating thereon, which coating comprises a water soluble or water dispersible high polymer and inorganic stratified particles, and which said coating contains an amine compound represented by the following general formula:

(R1 stands for a hydrogen atom, or $C_{1-6}$ alkyl or allyl or phenyl group; R2 stands for a hydrogen atom, or an optionally substituted alkyl or allyl group; and R3 stands for an optionally substituted alkyl or allyl group).

4. A gas barrier film according to claim 3, wherein the amine compound is an alkylamine having 1 to 4 carbon atoms, or an amino acid having 1 to 7 carbon atoms or a silane coupling agent having amino group.

5. A gas barrier film according to claim 1 or 3, wherein number of any surface defects of 0.2 $\mu$m or more on the said coating surface is 5/10 cm2 or less.

6. A gas barrier film according to claim 1 or 3, wherein the said coating surface has a surface parameter Rp of 1.4 $\mu$m or less.

7. A gas barrier film according to claim 1 or 3, wherein the coating has a water content of 2 mg/cm$^3$ or less.

8. A gas barrier film according to claim 1 or 3, wherein the relative intensity of a peak in the infra-red spectrum originating from polar groups of the water soluble or water dispersible polymer satisfies the following formula:

$$P=100\times(Pw-Pd)/Pd<35$$

Pw: Relative intensity of a peak originating from polar groups of the water soluble or water dispersible polymer in a wet condition Pd: Relative intensity of a peak originating from polar groups of the water soluble or water dispersible polymer in a dry condition.

9. A gas barrier film according to claim 1 or 3, wherein the coating contains 0.01 to 10 wt % of a crosslinking agent as a monomer component.

10. A gas barrier film according to claim 1 or 3, wherein the coating is oriented in at least one direction.

11. A gas barrier film according to claim 1 or 3, wherein the water soluble or water dispersible high polymer is a polyvinyl alcohol based polymer or any of its derivatives.

12. A gas barrier film according to claim 11, wherein the polyvinyl alcohol based polymer or any of its derivatives has at least two different constituents thereof.

13. A gas barrier film according to claim 1 or 3, wherein the inorganic stratified particles comprise particles having a diameter of 200 nm or less.

14. A gas barrier film according to claim 1 or 3, wherein the inorganic stratified particles comprise particles having a diameter of 1 $\mu$m or more.

15. A gas barrier film according to claim 1 or 3, wherein the coating contains at least two kinds of inorganic stratified particle having different respective diameters.

16. A gas barrier film according to claim 1 or 3, wherein a layer of a metal and/or metallic oxide is formed on the coating.

17. A gas barrier film according to claim 1 or 3, wherein a layer of a metal and/or metallic oxide is formed between the coating and the resin substrate.

18. A gas barrier film according to claim 1 or 3, wherein the surface roughness parameter $R_t/R_a$ is 20 or less.

19. A gas barrier film according to claim 1 or 3, wherein the surface roughness parameter $R_t/R_a$ is about 17 or less.

20. A gas barrier film according to claim 1 or 3, wherein the coating has a water content of 1.5 mg/cm$^3$ or less.

\* \* \* \* \*